United States Patent
Risbud

(10) Patent No.: US 7,930,370 B2
(45) Date of Patent: Apr. 19, 2011

(54) METHOD AND SYSTEM FOR REMOTE CONFIGURATION OF MANAGED NODES

(75) Inventor: Vinayak Risbud, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 631 days.

(21) Appl. No.: 11/967,823

(22) Filed: Dec. 31, 2007

(65) Prior Publication Data

US 2009/0172195 A1 Jul. 2, 2009

(51) Int. Cl.
*G06F 15/177* (2006.01)
(52) U.S. Cl. .......... 709/220; 709/223; 709/245; 710/11; 710/315
(58) Field of Classification Search .......... 703/220–223, 703/245, 227–228
See application file for complete search history.

(56) References Cited

U.S. PATENT DOCUMENTS

| | | | |
|---|---|---|---|
| 6,353,854 B1 * | 3/2002 | Cromer et al. ............... | 709/224 |
| 6,487,601 B1 * | 11/2002 | Hubacher et al. ............ | 709/229 |
| 7,007,077 B1 * | 2/2006 | Shinohara et al. ........... | 709/220 |
| 7,051,087 B1 * | 5/2006 | Bahl et al. ..................... | 709/220 |
| 7,664,834 B2 * | 2/2010 | Keith, Jr. ...................... | 709/220 |
| 2003/0005096 A1 * | 1/2003 | Paul et al. .................... | 709/222 |
| 2004/0160917 A1 * | 8/2004 | Eliznd et al. ................. | 370/334 |
| 2004/0210649 A1 * | 10/2004 | Bhogal et al. ................ | 709/222 |

OTHER PUBLICATIONS

U.S. Appl. No. 11/728,455, filed Mar. 26, 2007, Risbud, Vinayak.

* cited by examiner

*Primary Examiner* — Salad Abdullahi
(74) *Attorney, Agent, or Firm* — Pearl Cohen Zedek Latzer, LLP

(57) ABSTRACT

A method and system may send a first data packet on a network from a client node to a management server. The first data packet may be formatted to include a client Internet Protocol (IP) address field, a Universally Unique Identifier (UUID) request flag, a client UUID field, a client hardware address, and a first port number. The client node may listen for a second port number on the network and may receive a second data packet. The second data packet may have the same format as the first data packet and may include the second port number.

15 Claims, 4 Drawing Sheets

Note: GR: Guid Request
SI: Static IP Address Request
CR: Conflict Resolution

METHOD AND SYSTEM FOR REMOTE CONFIGURATION OF MANAGED NODES

BACKGROUND OF THE INVENTION

A client node on a network may be any device such as for example a server or other computer on a network that may be managed or administrated remotely by for example network management software. When the client node first attaches to the network, the network management software may attempt to configure the node remotely for operation on the network or for other uses. However, attempts to configure the newly attached client node may be unsuccessful if the client node has no assigned address or identifier such as for example an Internet Protocol (IP) address or Universally Unique Identifier (UUID) because network management software may be unable to detect the client node.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

Figure 1:
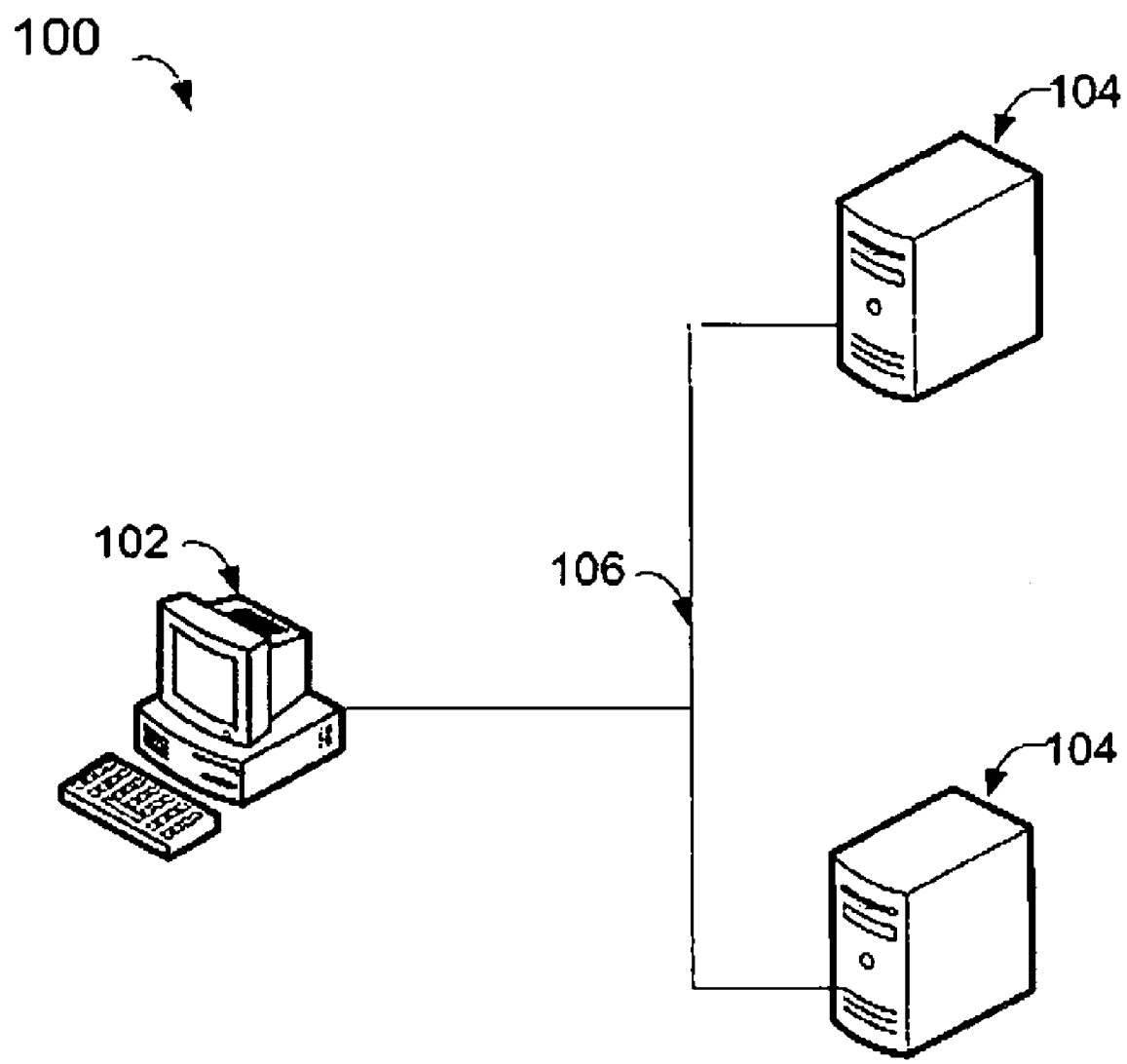
FIG. 1 is a schematic illustration of a network according to an embodiment of the invention.

It will be appreciated that for simplicity and clarity of illustration, elements shown in the drawings have not necessarily been drawn accurately or to scale. For example, the dimensions of some of the elements may be exaggerated relative to other elements for clarity or several physical components included in one functional block or element. Further, where considered appropriate, reference numerals may be repeated among the drawings to indicate corresponding or analogous elements. Moreover, some of the blocks depicted in the drawings may be combined into a single function.

DETAILED DESCRIPTION OF THE INVENTION

In the following detailed description, numerous specific details are set forth in order to provide a thorough understanding of the invention. However it will be understood by those of ordinary skill in the art that the present invention may be practiced without these specific details. In other instances, well-known methods, procedures, components and circuits have not been described in detail so as not to obscure the present invention.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices. In addition, the term "plurality" may be used throughout the specification to describe two or more components, devices, elements, parameters and the like.

Embodiments of the invention may provide a method and system for remote configuration of a managed node. In one embodiment, a client node upon joining a network may check internally for the presence of UUID or other network identifier or address assigned to the client node. If no network identifier is assigned, the client node may create a request for a UUID or other identifier in for example a remote configuration protocol (RCP) format and broadcast the request on the network. A management server or other device running management software may receive the request and respond with a newly generated UUID also sent in the RCP format. The client node may receive the newly generated UUID and store it for subsequent usage. To facilitate communications between a management server and a client node, data packets may be sent on different UDP ports depending on the source, e.g. a management server or a client node. Embodiments of the invention may also be used for assigning a static IP address to the client node and/or for resolving IP addressing conflicts on the network.

Reference is now made to FIG. 1, a schematic illustration of a network system 100 capable of remotely configuring a managed node according to an embodiment of the invention. Although the invention is not limited in this respect, network system 100 may include a management server 102 and one or more client nodes 104 having management controllers that may be connected to a network 106. Other network devices may also be included in network system 100.

In some embodiments, management server 102 may include or may be, for example, a personal computer, a desktop computer, a mobile computer, a laptop computer, a notebook computer, a terminal, a workstation, a server computer, a network device, or other suitable computing device capable of managing the remote configuration of client nodes on a network. In some embodiments, management server 102 may be a server executing management control software and may operate in accordance with one or more standards for monitoring and managing a network or other computer system. For example, management server 102 may operate in accordance with the Intelligent Platform Management Interface (IPMI) standard as described in one or more specifications such as pre IPMI v2.0 rev. 1.0 specification markup for IPMI v2.0/v1.5, published Feb. 15, 2006.

Client node(s) 104 may be or include, for example, a personal computer, a desktop computer, a mobile computer, a laptop computer, a notebook computer, a terminal, a workstation, a server computer, a personal digital assistant (PDA) device, a network device, or other suitable computing device that may require configuration for communication as a node on a network. A client node 104 may require configuration for example after manufacturing and prior to its intended operational installation or after being reset to an original operating state. In these and other instances, configuration may include assigning one or more network identifiers to the client node 104. Such network identifiers may be or include a UUID, a dynamic IP address, a static IP address, or other identifiers for distinguishing a client node from its peers. Additionally, configuration may also include resolving an addressing conflict that may occur for example during or after assignment of a network identifier and other situations.

Management server 102 may communicate with one or more client nodes 104 over network 106. Network 106 may be any network such as a local area network (LAN), wide area network (WAN), wireless network or similar network as known in the art capable of data communications between management server 102 and one or more client nodes 104. Nodes on network 106 may exchange traffic using for example TCP/IP, UDP, and/or other standard data packaging protocols for communicating over a network.

Figure 2:
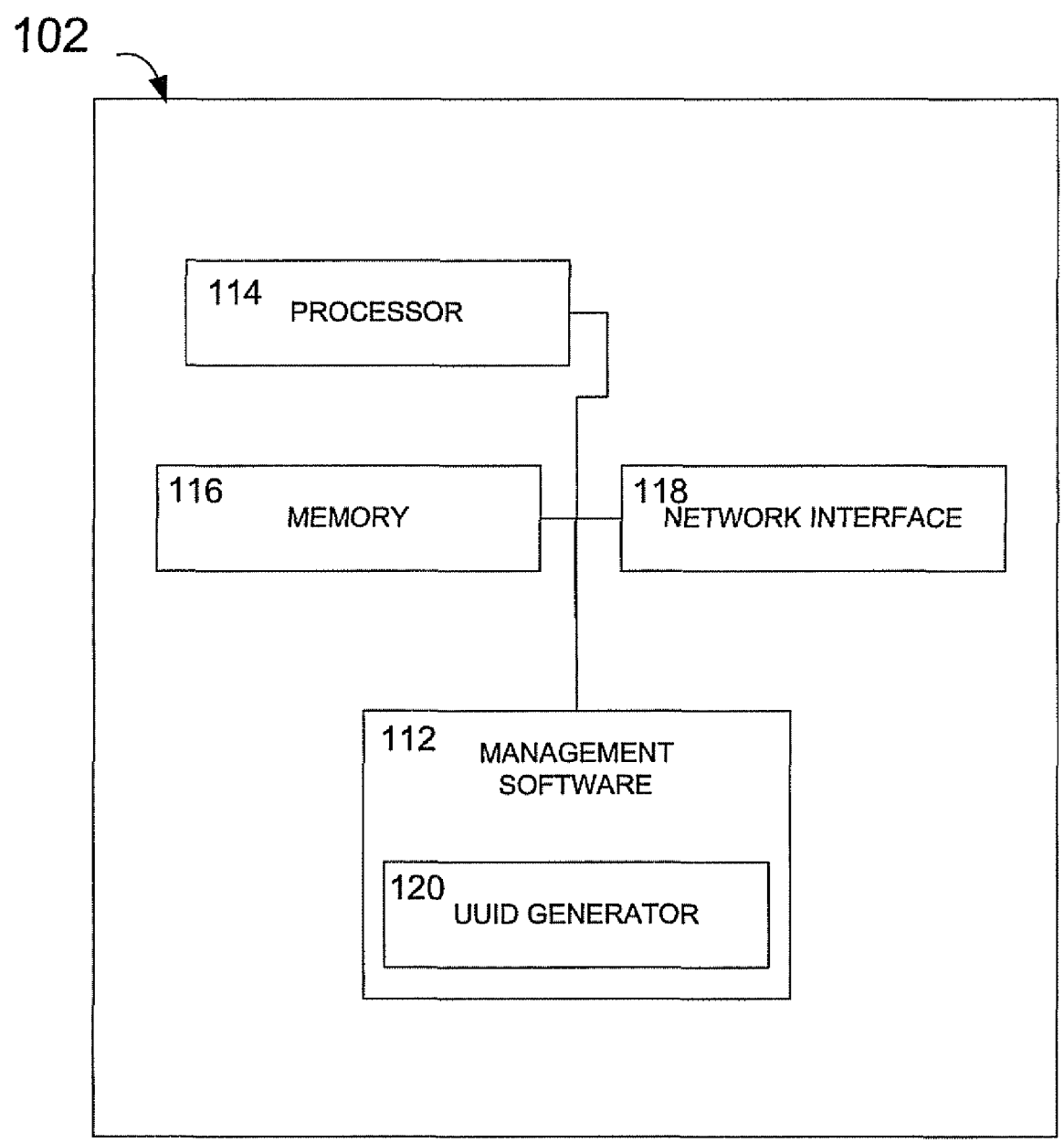
FIG. 2 is a schematic illustration of a management server on a network according to an embodiment of the invention.

Reference is now made to FIG. 2, a schematic illustration of a management server 102 on a network according to an embodiment of the invention. In some embodiments, the management server 102 of FIG. 2 may remotely configure one or more client nodes such as, e.g. client node 104 over a network such as network 106. Management server 102 may be any appropriate computing platform and may include for example management software 112, a processor 114, a memory 116, and a network interface 118. Other components may also be included.

Management software 112 may be a software or hardware component of management server 102 configured to execute instructions for or administer the remote configuration of client nodes on a network. In some embodiments, management software 112 may be executed by for example processor 114 and may have data and/or instructions stored in memory 116 although other implementations are possible.

As part of its operation, management software 112 may be responsible for creating or managing addresses or identifiers such as UUIDs for assigning to for example a client node 104. This function may be accomplished by for example a UUID generator such as UUID generator 120. UUID generator 120 may incorporate one or more algorithms to generate UUIDs or other identifiers that are standardized according to for example the Open Software Foundation (OSF) as part of the Distributed Computing Environment (DCE) and/or a specific implementation of such standards such as for example Microsoft's Globally Unique Identifiers (GUIDs). Other implementations may also be used.

Processor 114 may be or include for example a central processing unit (CPU), a digital signal processor (DSP), a microprocessor, a controller, a chip, a microchip, or any suitable multi-purpose or specific processor or controller. In some embodiments, for example, processor 114 may perform calculation operations or processing operations which may be used in the operation of management server 102. For example, processor 114 may execute instructions for the operation of management software 112. Processor 114 may include multiple processors.

Memory 116 may include, for example, one or more memories such as a random access memory (RAM), a read only memory (ROM), a dynamic RAM (DRAM), a synchronous DRAM (SD-RAM), a Flash memory, a volatile memory, a non-volatile memory, a cache memory, a buffer, a short term memory unit, a long term memory unit, or other suitable memory units for storing data and or software components such as management software 112 and its data.

Network interface 118 may operate as a physical layer (e.g., Open System Interconnection (OSI) layer 1) and a data layer (e.g., OSI layer 2) component providing a physical access networking medium and low-level addressing such as for example through MAC addresses. Network interface 118 may be implemented as a software application executed in a component of management server 102 or as a hardware component integrated within management server 102 or as a hardware component of some other hardware component of management server 102. In some embodiments, network interface 118 may also be implemented as for example an intelligent NIC and may include a processor and memory.

In some embodiments, network interface 118 may operate using for example Ethernet technology and may utilize TCP, UDP and/or other protocols in accordance with one or more IEEE or other such standards for communicating with client nodes 104. Accordingly, the protocols employed may incorporate port numbering for mapping transported data to particular processes or applications running for example on management server 102 or client node 104. To facilitate proper mapping of the present RCP data packets, in some embodiments one or more ports may be designated for transmission or reception of particular packet types. For example, clients may send RCP data packets on port 6060 and management servers may listen on port 6060, and management servers may send RCP data packets on port 6061 and clients may listen on port 6061. Other port numbers and/or techniques for mapping RCP protocol packets received at management server 102 and client nodes 104 may also be used.

Although FIG. 2 shows management software 112, processor 114, memory 116, and network interface 118 as separate components, the present invention is not limited in this regard. The functions of these components may be distributed differently among these or additional components. For example, listening for data packets may occur as part of management software 112, network interface 118 may be implemented as a software component stored in memory 116, or the like.

Figure 3:
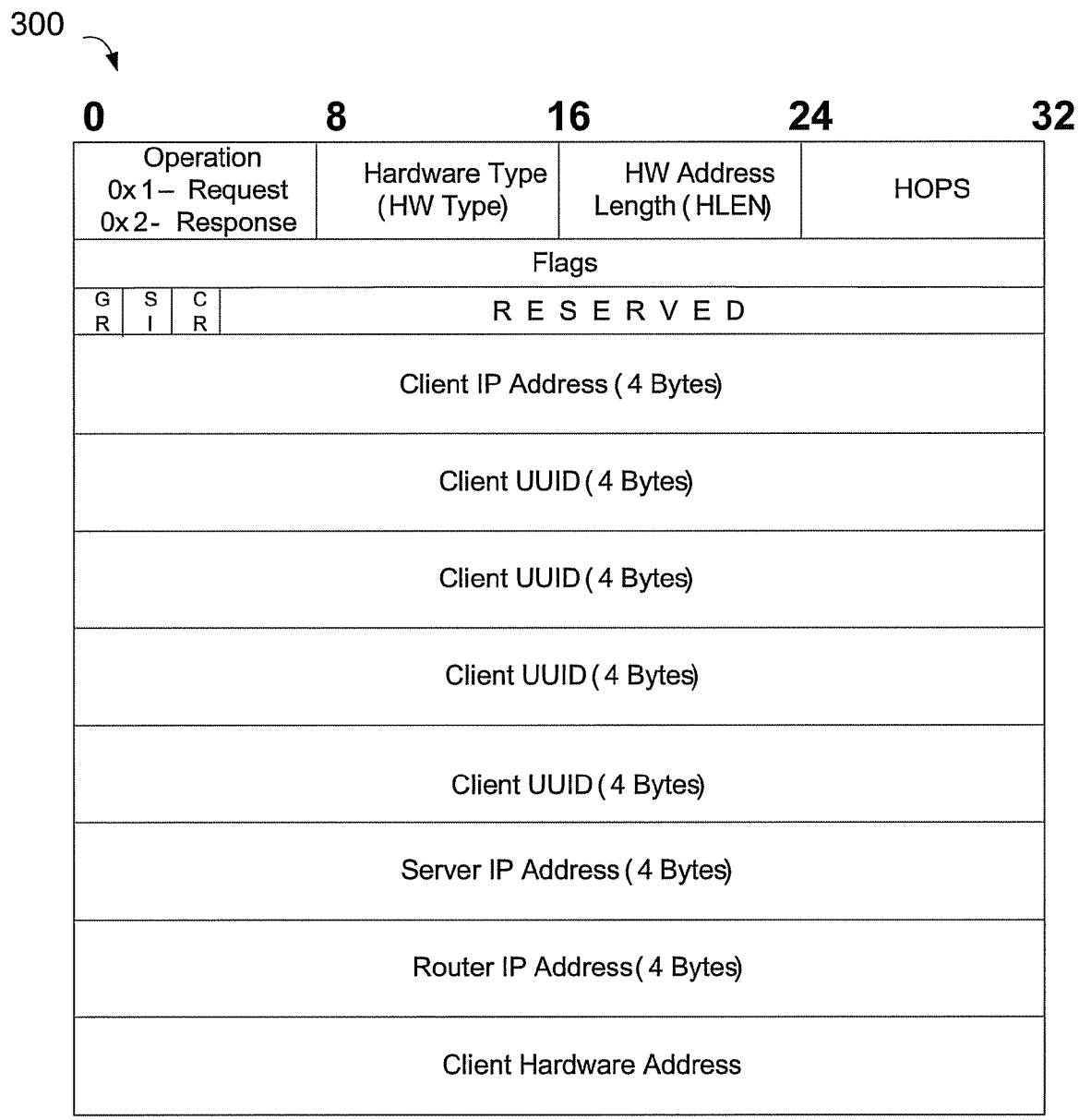
FIG. 3 is an illustration of a data format according to an embodiment of the invention.

Reference is now made to FIG. 3 which is an illustration of an RCP format for a data packet 300 which may be used for sending data for remote configuration of a client node according to an embodiment of the invention. In some embodiments, data packets employing this RCP packet may be sent for example using a UDP protocol which supports connectionless communications, although other protocols may be used. Combining a UDP protocol with listening for RCP data packets on specified ports such as 6060 and 6061 may allow for communications without a prior handshake established, thereby allowing a management server 102 to receive and process an RCP data packet from an unidentified client node 104 that may for example have no assigned UUID.

For the RCP format of FIG. 3, each data packet may include at least an operation type, a hardware type, a hardware address length (HLEN), the number of hops traveled by the packet, one or more flags for indicating the message type, a client node IP address, a client node UUID, a server IP address, a router IP address and a client hardware address. Other or additional fields may also be present in an RCP data packet. Furthermore, one or more bits, flags and or fields may be reserved in the packet format for subsequent uses or other indicators. For example, flags may be used to indicate which operation such as for example a UUID request, static IP address request, or IP conflict resolution, is being performed. Other contents may be in a data packet according to various embodiments of the invention.

The length of an RCP data packet may be 40 bytes, although other packet lengths may be employed depending on the length and number of the fields included in the packet. The length of these fields may vary according to the various conventions, standards and protocols employed. For example in some embodiments, the operation type field may be a three bit field such that a "0x1" may indicate a client request packet and a "0x2" may indicate a management server response packet. Furthermore, each of the IP addresses—client node, server, and router—may be a four byte field. The client hardware address length may depend on the type of physical layer technology in the network such as for example token ring or Ethernet. An Ethernet system may for example have a client hardware address length of six bytes which may in turn also be reflected in the HLEN field.

Figure 4:
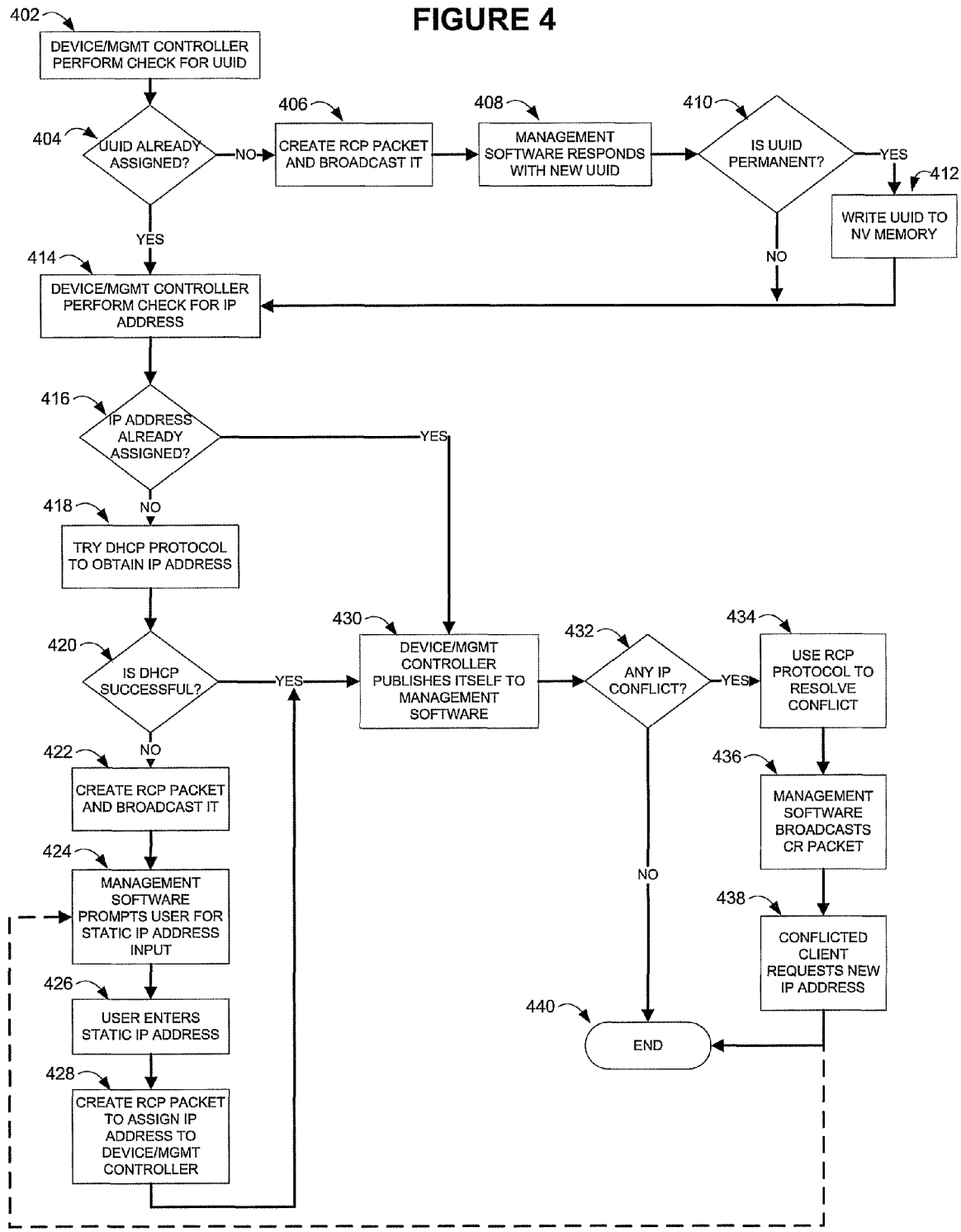
FIG. 4 is a flowchart of a method for remote configuration of a managed node according to an embodiment of the invention.

Reference is now made to FIG. 4 which is a flowchart of a method for remote configuration of a managed node according to an embodiment of the invention. Embodiments of the method may be used by, or may be implemented by, for example, management server 102 and client node 104 on network 106 in system 100 of FIG. 1 or by other suitable wired and/or wireless communication devices, stations, nodes, systems and/or networks. Embodiments of the method may also use the RCP packet format of FIG. 3 for data communications in remote configuration of managed nodes, or other suitable data packet protocols, formats, and data structures. Embodiments may include port listening on specific ports such as a management server listening on port 6060 and a client node listening on port 6061, but other ports may be used.

Some or all of the operations of FIG. 4 may be used for specific tasks in remote configuration of a client node 104 such as for example obtaining a UUID for client node 104 from management server 102, remotely obtaining a static IP address for client node 104 from management server 102, and/or resolving an IP address conflict between for example two or more client nodes 104. Other or additional operations using the RCP packet format and port listening as described above are also possible.

As indicated in operation 402, a network device such as e.g. client node 104 or the management controller of a network device may check to see if the network device has an assigned network identifier such as, e.g. a UUID. Checking for a UUID may be required during for example initial configuration of a server that has just been manufactured and is being attached to a network for the first time. Alternatively, a server may require complete re-initialization during its operational life and may no longer have an assigned UUID. Other circumstances during which a client node may request a new UUID may also utilize methods according to embodiments of the present invention.

An assigned UUID may for example be stored in non-volatile memory such as for example memory 116, although other storage locations for an assigned UUID are possible.

In operation 404, a determination may be made of whether an assigned identifier such as UUID exists for client node 104. If no UUID exists, then in operation 406 client node 104 may create or generate a data packet in for example the RCP protocol of for example FIG. 3 that requests a UUID and may broadcast the RCP data packet on the network although other protocols may be used.

In some embodiments, the packet may be broadcast for example as a UDP protocol data packet on for example port 6060 although other protocols and ports may be used. Further, in some embodiments, a three bit operation type field in the packet may be set to for example "0x1" to indicate that the packet is a client request, and a first bit flag in a reserved field may be set to 1 to indicate the message type as a GUID request, e.g. a UUID generated according to a convention for generating GUIDs. If client node 104 already has an assigned IP address, the client node IP address field of the RCP data packet may be filled with the client IP address. Alternatively, if the client node has no assigned IP address, e.g. the IP address=0.0.0.0, the client node IP address field may be blank or filled with or set to for example 0.0.0.0 or some other filler value.

Management server 102 may listen for RCP protocol formatted data packets on for example port 6060, e.g. the same port on which client node 104 may broadcast. If management server 102 receives an RCP that is flagged or otherwise identifiable as a request for a GUID or UUID, it may respond by generating a new GUID or UUID according to one or more standards or convention as known using for example a UUID generator such as UUID generator 120. Alternatively, management server 102 may also be attached to a separate device, server, or system for running a UUID generator. Other techniques for generating a UUID and incorporating the UUID in the RCP response packet may also be used. Management server 102 subsequently may send an RCP formatted response data packet containing the new UUID back to client node 104 (operation 408) on for example port 6061, although other protocols and formats may be used.

In some embodiments, the form of management server 102's response may depend on whether the client IP address field of the received RCP request is set to for example 0.0.0.0, e.g. client node 104 has no assigned IP address. If the client IP address field of the received RCP request is set to 0.0.0.0, then management server 102 may send the RCP response packet on port 6061 as a UDP broadcast. Because the RCP response packet may contain the hardware address of client node 104 according to for example the RCP protocol of FIG. 3, client node 104 may be able to recognize that it is the intended destination for the RCP response packet and may be listening for its hardware address on port 6061. If the client IP address of the received RCP request is not equal to 0.0.0.0, e.g. client node 104 has an assigned IP address, then management server 102 may send the RCP response packet on port 6061 as a UDP unicast using client node 104's IP address as the destination. Additionally a three bit operation type field may be set to "0x2" to indicate that the data packet is a response In some embodiments, client node 104 may listen for an RCP response packet on for example port 6061 and may include an internal timeout mechanism to stop listening for a response packet. If no response is received, client node 104 may resend the RCP request packet one or more additional times.

If client node 104 receives the RCP response packet from management server 102, it may determine if the GUID or UUID is required as a permanently assigned UUID in operation 410. If client node 104 should require the GUID or UUID as a permanently assigned UUID, then in operation 412 the UUID may be written to a non-volatile memory.

If, in operation 404, it is determined that a UUID exists for client node 404, then the method may proceed with operation 414. Alternatively, the method may proceed to operation 414 if client node has no requirement to store the assigned UUID permanently or after operation 412. In some alternative embodiments, the method may also begin with operation 414 if a client node 104 of a system including for example at least a management server 102 and a client node 104 and operating in accordance with the invented RCP data protocol described herein requires the assignment of a static IP address.

In operation 414, client node 104 and/or management server 102 may determine if client node 104 has an assigned IP address by techniques as known in the art. If client node 104 has no assigned IP address, client node 104 may try obtaining an IP address using for example a Dynamic Host Configuration Protocol (DHCP) or other protocol for assigning IP addresses (operation 418). In some embodiments, management server 102 may be the DHCP server. Alternatively, another server or other suitable device may be the DHCP server.

In operation 420, client node 104 and/or management server 102 may determine if an IP address for client node 104 was successfully assigned. If not, in operation 422 client node 104 may create and send an RCP data packet that, in some embodiments, may have the same format as that created in operation 406 and having the operation type set to "0x1". However, the RCP data packet of operation 420 may have a second bit flag in a reserved field set to 1 to indicate the message type as a static IP address request. Other operational type field settings and bit flag settings may also be used.

Client node 104 may broadcast the static IP address request packet as a UDP protocol on for example port 6060, and management server 102 may listen on port 6060 for a request packet. Upon receipt of the static IP address request packet, management server 102 may attempt to obtain a static IP address for client 104 by for example prompting a user for a static IP address input (operation 424). Alternative techniques for obtaining or assigning a static IP address known in the art may also be used. Once a user enters at static IP address in operation 426, management server 102 may create or generate an RCP response packet containing the static IP address and send the packet to client node 104 on for example port 6061 as a UDP broadcast sent to the hardware address of client node 104. In some embodiments, the RCP response packet may have the three bit operation type field set to "0x2" to indicate a response, although other indicators may be used.

In operation 420, if the DHCP protocol is successful in providing a static IP address to client node 104, then the method may proceed with operation 430. Alternatively, client node 104 may be listening on port 6061, may receive the RCP response packet containing the static IP address, and may proceed to operation 430.

In operation 430, client node 104, e.g. the network device, may publish or send its assigned identifier or address, such as an IP address, to management server 102 and/or other network management software as known in the art. Using techniques known in the art, management server 102 may determine if the IP address assigned to client node 104 conflicts with the IP address of another device or entity on for example network 106 (operation 432).

If an IP conflict exists, management server 102 or other network manager or administrator may initiate an IP address conflict resolution using for example an RCP protocol (operation 434). In operation 436, management server 102 may broadcast an IP conflict resolution RCP data packet to a number of client nodes 104 on for example port 6061 with a third bit flag in a reserved field set to 1 indicating the message type as a conflict resolution request and the operation type set to a request. In some embodiments, the contents of the UUID field, the client address field and the client hardware address field of the packet may correspond to the UUID, client address, and client hardware address of the client device, e.g. client node 104, whose IP address was published in operation 430.

Although all network devices on network 106 may receive the broadcast IP conflict resolution RCP packet and may be listening on port 6061, only the device with corresponding UUID, e.g. the client node having the conflicted IP address, may respond to it. Client node 104 may then, in operation 438, request a new IP address. In some embodiments, this request may be in the same format as the request of operation 422 and the method may proceed for example as in operations 424 to operation 432, although other techniques for requesting a new IP address may be used.

If, in operation 432, it is determined that there is no IP conflict on the network, the method may terminate in operation 440.

Other operations or series of operations may be used.

In some embodiments, the format of an RCP data packet may include a field for a client name for example as a character string having a pre-determined number of bytes for assigning a name to a client node. In data packets so formatted, the operation type may also indicate a name assignment operation with for example "0100b" in the bit field. The dialogue between management server 102 and client node 104 may include requests for assignment of a network identifier as described herein along with requests for assignment of a client name.

In some embodiments, the format of an RCP data packet may include N additional fields containing N UUIDs for identifying which N client nodes 104 are to receive an IP multicast. A separate field may also include the number N, e.g. the number of client nodes 104 to receive the multicast. The operation type may also indicate that the management server is assigning a multicast IP address. Management server 102 may send this RCP packet out as a UDP broadcast; however, only client nodes whose UUIDs are listed in the packet may accept the packet.

While the invention has been described with respect to a limited number of embodiments, it will be appreciated that many variations, modifications and other applications of the invention may be made. Embodiments of the present invention may include other apparatuses for performing the operations herein. Embodiments of the invention may include a computer readable medium, such as for example a memory, a disk drive, or a USB flash memory, including instructions which when executed by a processor or controller, carry out methods disclosed herein. Such apparatuses may integrate the elements discussed, or may comprise alternative components to carry out the same operations. It will be appreciated by persons skilled in the art that the appended claims are intended to cover all such modifications and changes as fall within the true spirit of the invention.

The invention claimed is:

1. A method comprising:
   sending a first data packet on a network from a client to a management server, the data packet formatted to include at least a client Internet Protocol (IP) address field, a Universally Unique Identifier (UUID) request flag, a client UUID field, a client hardware address, and a first port number, wherein the management server is listening on a first port corresponding to the first port number;
   listening at the client on a second port corresponding with a second port number on the network for the client hardware address; and
   receiving at the client a second data packet from the management server, the second data packet containing the second port number and the client hardware address if the client has no assigned IP address.

2. The method of claim 1, wherein the client IP address field is set to 0.0.0.0.

3. The method of claim 1, wherein the first and second data packets are sent as Universal Datagram Protocol (UDP) packets.

4. The method of claim 1, wherein the first and second data packets have a Remote Configuration Protocol (RCP) format.

5. The method of claim 1:
   wherein the first data packet is a UUID request; and
   the second data packet includes a UUID assigned to the client.

6. The method of claim 5, wherein the second data packet is sent as a Universal Datagram Protocol (UDP) broadcast.

7. The method of claim 1, comprising:
   sending the first data packet on the network from a client to a management server, wherein the first data packet is a static IP address request; and
   the second data packet including a static IP address assigned to the client.

8. The method of claim 1, comprising:
   sending the first data packet on the network from a management server to a plurality of clients, wherein the data packet is an IP address conflict resolution request, the IP address conflict resolution request containing at least a UUID of a client with a conflicted IP address, and wherein the plurality of clients are listening on the second port number;

receiving the second data packet at the management server from the client with the conflicted IP address, wherein the second data packet is a static IP address request, and wherein the second data packet includes the first port number; and sending a third data packet on the network from the management server to the client with the conflicted IP address, the third data packet including a static IP address assigned to the client and including the second port number.

9. A system, comprising:

a client node connected to a network to send a first data packet on the network to a management server, the data packet formatted to include at least a client Internet Protocol (IP) address field, a Universally Unique Identifier (UUID) request flag, a client UUID field, a client hardware address, and a first port number, the client node to listen on a second port corresponding to a second port number on the network for the client hardware address and to receive a second data packet from the management server, the second data packet containing the second port number and the client hardware address if the client has no assigned IP address, wherein the management server is listening on a first port assigned to the first port number.

10. The system of claim 9, comprising:

the management server connected to the network to send the second data packet and to listen for the first port number.

11. The system of claim 9, wherein the first and second data packets are sent as Universal Datagram Protocol (UDP) packets.

12. The system of claim 9, wherein the first and second data packets have a Remote Configuration Protocol (RCP) format.

13. The system of claim 9, wherein the the first data packet is a UUID request, and the second data packet includes at least a UUID assigned to the client.

14. The system of claim 13, wherein the second data packet is sent as a UDP broadcast.

15. The system of claim 9, wherein the first data packet is a static IP address request, and the second data packet includes a static IP address assigned to the client node.

* * * * *